United States Patent

Kavieff

[15] 3,636,884

[45] Jan. 25, 1972

[54] TOW PIN POSITION FOR FLOOR TRUCK TOW LINES

[72] Inventor: Shelden M. Kavieff, Farmington, Mich.
[73] Assignee: Jervis B. Webb Company
[22] Filed: Jan. 20, 1966
[21] Appl. No.: 521,976

[52] U.S. Cl. ..................................................104/172 BT
[51] Int. Cl. .............................................................B65g 17/42
[58] Field of Search .................................104/172, 178, 176

[56] References Cited

UNITED STATES PATENTS

| | | | |
|---|---|---|---|
| 3,015,284 | 1/1962 | Klamp | 104/172 |
| 3,044,416 | 7/1962 | Reibel | 104/172 |
| 3,103,895 | 9/1963 | Bradt | 104/88 |

*Primary Examiner*—Arthur L. La Point
*Assistant Examiner*—Robert Saifer
*Attorney*—Farley, Forster and Farley

[57] ABSTRACT

A floor truck having a tow pin driven by a tow line pusher, and fixed front and rear bumpers enabling a driven truck to push a preceding nondriven truck. Interconnected front and rear tow pin positioning bumpers raise the tow pin by rearward and upward movement from a normal forward position when engaging a stop, or the rear positioning bumper of a preceding truck, so a bank of trucks may accumulate. A retaining device prevents return movement of the positioning bumpers and tow pin of any following truck until the tow pin of the leading truck in the bank is engaged by a pusher.

20 Claims, 7 Drawing Figures

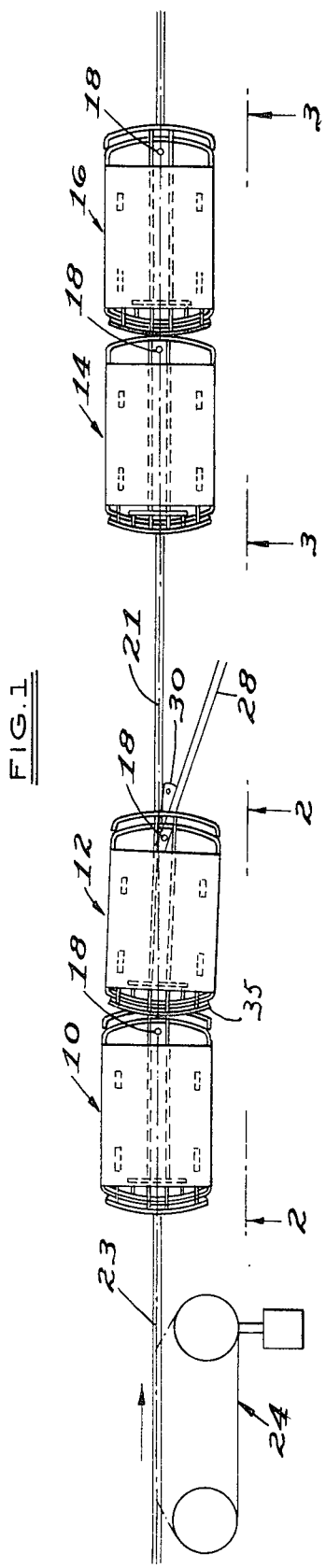
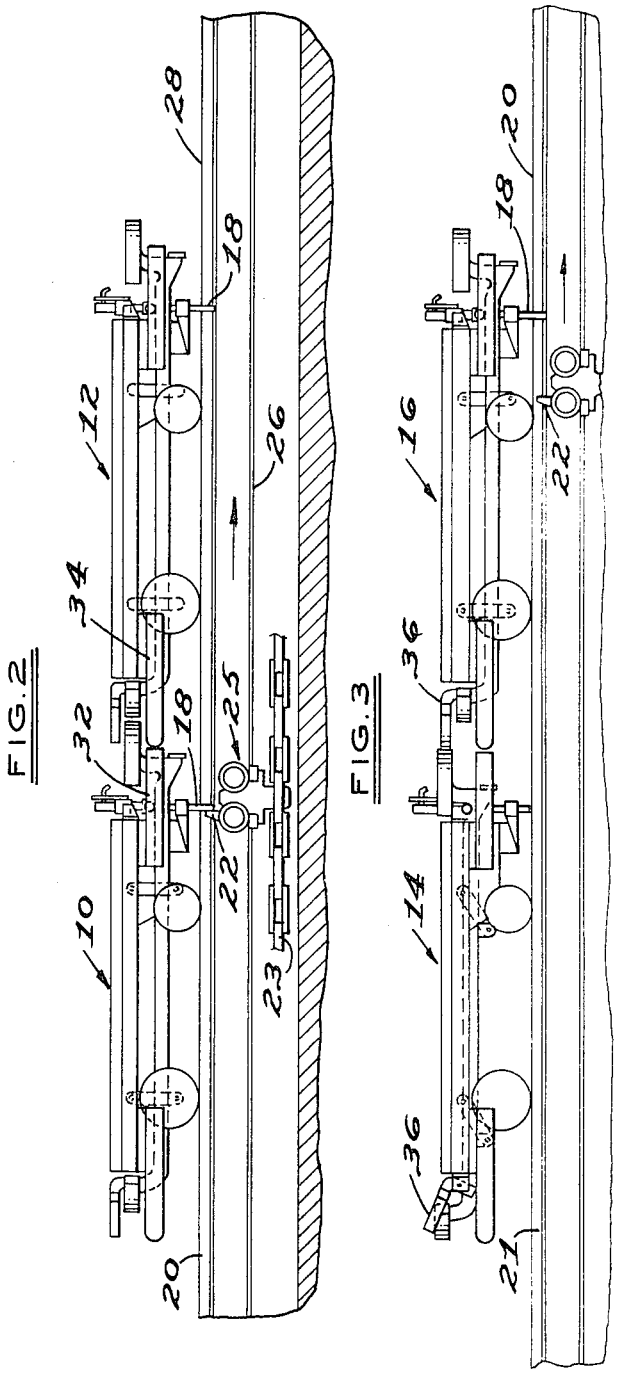
INVENTOR.
SHELDEN M. KAVIEFF
BY Farley, Forster & Farley
ATTORNEYS

TOW PIN POSITION FOR FLOOR TRUCK TOW LINES

This invention relates to improvements in floor truck tow lines of the type having a plurality of floor trucks each equipped with a tow pin engageable in a driving position by a pusher of a tow line and movable between such driving position and a nondriving position. The improvements of the invention more particularly relate to mechanism for moving the tow pin from driving to nondriving position and for controlling a return movement of the tow pin to driving position.

In floor truck tow line installations it is desirable to provide for movement of the tow pin of a floor truck to nondriving position if the truck encounters an obstacle in the path of travel along the tow line; to prevent movement of the tow pin to nondriving position if the floor truck overtakes a preceding floor truck which has been diverted to a nonpowered branch line so that the preceding floor truck will be pushed out of the path of travel; to provide for the accumulation of floor trucks in banks by moving the tow pin of a floor truck to nondriving position as it overtakes a preceding floor truck whose drive pin is also in nondriving position; and, to provide for releasing the floor trucks from a bank in the order in which they were accumulated therein by automatically and successively returning the tow pins of floor trucks in a bank to driving position as the tow pin of the leading truck in a bank is engaged by a pusher of the tow line and the leading truck moved on.

The object of the present invention in general is to provide a tow pin positioning mechanism which enables all the foregoing functions to be performed, with particular emphasis upon a mechanism which will automatically permit the orderly release of floor trucks from a bank in which they have been accumulated, it being recognized that various prior devices have been employed for performing the other three functions, either individually or in various combinations. A further object of the invention is to provide improvements to these prior devices.

According to one aspect of the invention a floor truck tow line having a plurality of floor trucks each equipped with a tow pin engageable in a driving position by a pusher of the tow line and movable to nondriving position, includes tow pin positioning mechanism on each floor truck for moving the tow pin of a following truck to the nondriving position upon overtaking an immediately preceding leading truck the tow pin of which is also in nondriving position whereby a series of floor trucks can be stopped and accumulated in a bank as each following floor truck overtakes the immediately preceding leading truck, and means for releasing floor trucks from a bank in the order of accumulation therein including a retaining device on at least one floor truck of each pair of adjacent leading and following floor trucks for holding the tow pin of the following truck in nondriving position until the tow pin of the leading floor truck has been engaged by a pusher of the tow line.

The tow pin positioning mechanism of the invention includes a front bumper, a rear bumper and structure interconnecting said bumpers to form a bumper assembly; means mounting the bumper assembly on a floor truck for movement between a forward position and a rearward position with a change in elevation therebetween, means biasing the bumper assembly to the forward position thereof, means for moving the tow pin to nondriving position in response to movement of the bumper assembly to the rearward position, the rear bumper in the rearward position thereof being engageable by the front bumper of an immediately following truck in the forward position thereof. The retainer device comprises a member mounted on the rear of a leading floor truck for engagement by the bumper assembly of an immediately following floor truck when such bumper assembly is in the rearward position thereof and when the bumper assembly of the leading truck has returned to the forward position thereof so that the tow pin of the following truck is held in nondriving position until the tow pin of the leading truck has been engaged by the pusher of the tow line.

Other features and advantages of the invention will appear from the following description of the representative embodiment disclosed in the accompanying drawings in which:

FIG. 1 is a schematic plan view of a portion of a floor truck tow line;

FIG. 2 is a sectional elevation of a portion of the tow line of FIG. 1 taken as indicated by the line 2—2 thereof and illustrating a following truck pushing an immediately preceding truck onto a branch line;

FIG. 3 is an elevation similar to FIG. 2 but taken along the line 3—3 of FIG. 1 and showing a truck accumulated or banked behind a preceding truck;

Figure 4:
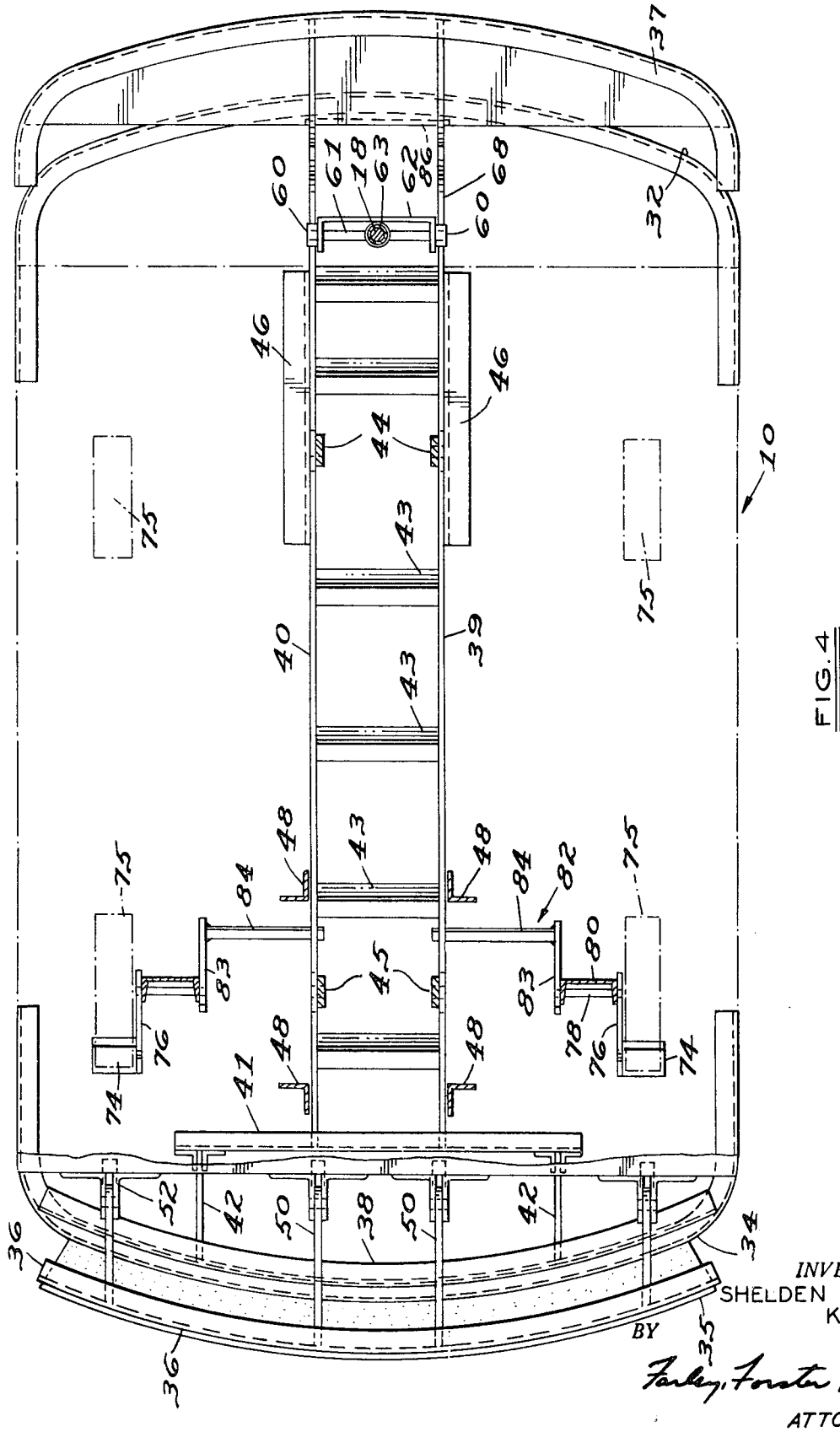
FIG. 4 is an enlarged plan view of a floor truck constructed in accordance with the invention, the load platform and frame structure being broken away.
Figure 5:
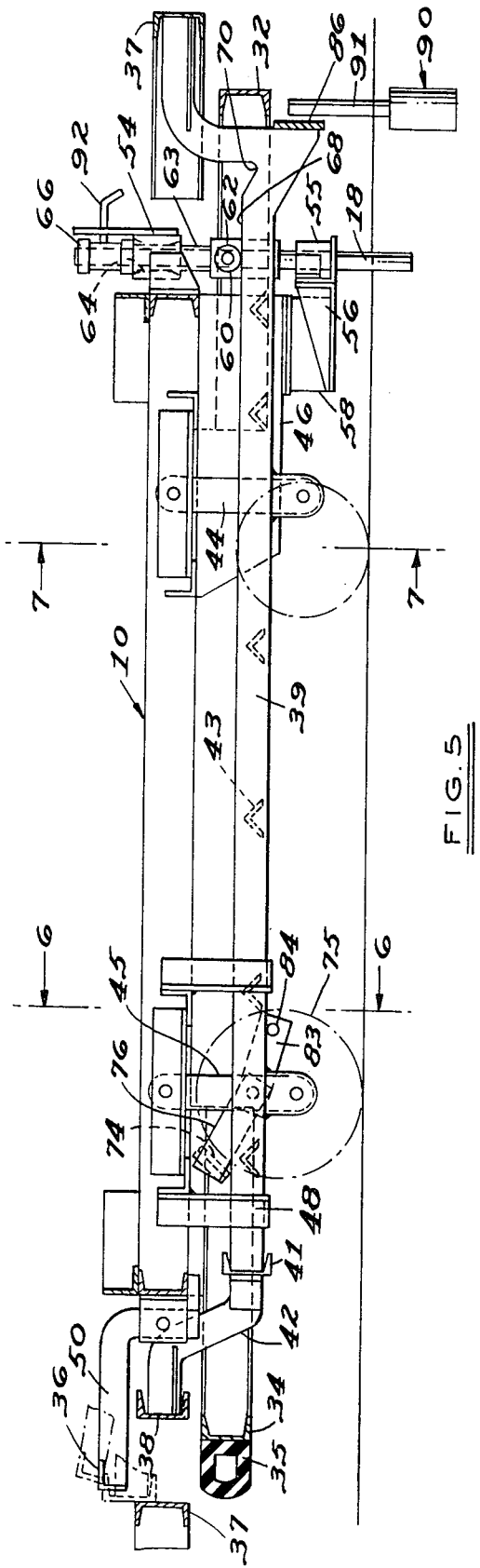
Figure 6:
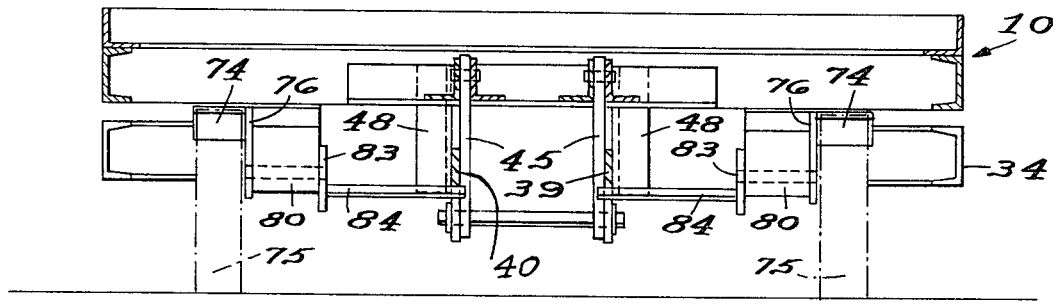
Figure 7:
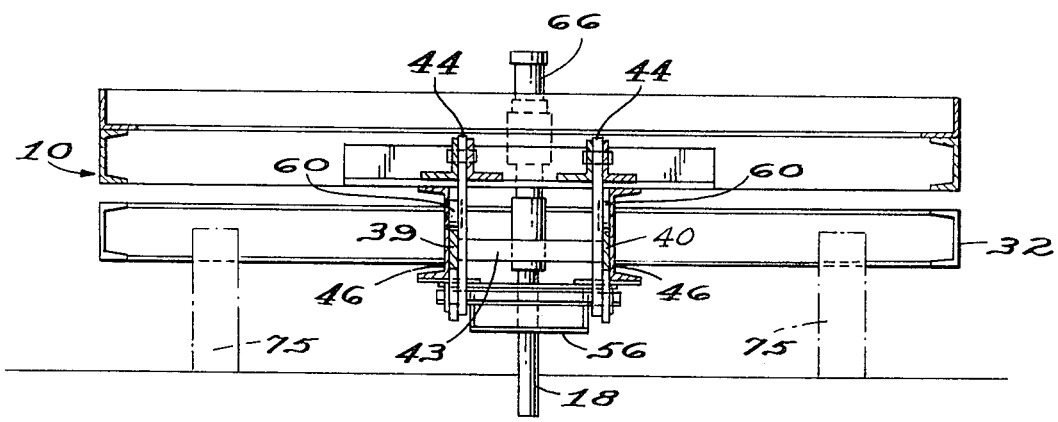

FIG. 5 is an elevation of the floor truck of FIG. 4 shown partly in section; and FIGS. 6 and 7 are respectively sectional elevations taken as indicated by the lines 6—6 and 7—7 of FIG. 5.

Referring to FIGS. 1–3, the floor truck tow line shown is of the type in which floor trucks 10, 12 14 and 16, each equipped with a vertically movable tow pin 18, are propelled along a floor 20 or other supporting surface in a path defined by a guide slot 21 by engagement between a pusher 22 of the tow line with a lowered tow pin 18 as indicated in FIG. 2. The tow line includes an endless chain 23 driven by a suitable drive unit 24 and supported by trolleys 25 from tracks 26. A branch line guide slot 28 is shown in FIG. 1 and a floor truck tow pin can be selectively diverted into this branch slot by operation of a switch 30. No tow line is provided for the branch slot; in other words, the branch line is unpowered.

One of the functions performed by the tow pin positioning mechanism of the invention is illustrated by the trucks 10 and 12 at the left of FIG. 1. Truck 12 has had its tow pin 18 diverted into the branch slot 28, losing engagement with a pusher 22 of the tow line, and has stopped. Following truck 10 has overtaken the truck 12 and is about to push it along the branch slot 28 out of the path of travel along the main slot 21. This pushing condition is illustrated in FIG. 2. The tow pin 18 of the leading truck 12 has entered the branch slot 28 and is in the lowered or driving position though not engaged by a pusher. The following truck 10, driven by a pusher 22, has overtaken and contacted the leading truck 12, contact taking place between a fixed pushing bumper 32 on the front of the truck 10 and a fixed pushing bumper 34, having a resilient pad 35, on the rear of the truck 12.

A second condition is illustrated at the right of FIG. 1 and in FIG. 3. Leading truck 16 has been stopped and following truck 14 has overtaken it and been stopped by operation of the tow pin positioning mechanism of the invention resulting in the trucks 14 and 16 being accumulated in a bank. As shown in FIG. 3, the tow pin 18 of leading truck 16 has been returned to driving position and is about to be picked up by a pusher 22 to move the leading truck from the bank. At the time the tow pin 18 of the leading truck is lowered, the position of pushers 22 of the tow line relative to the trucks in the bank is not known and hence if the tow pins of all trucks in the bank were lowered, the tow pin of any one of the following trucks could just as well be the first one to be engaged by an advancing pusher, causing more than one truck of the bank to move on in pushing relation and overloading the tow line and driving parts. The present invention prevents these undesirable conditions by providing a means for releasing the trucks 16 and 14 in the order of their accumulation in the bank, this means including a retaining device 36 on the leading one of the pair of trucks 14 and 16 for holding the tow pin 18 of the following truck 14 in nondriving position until the tow pin of the leading truck 16 has been engaged by a pusher of the tow line and the truck moved ahead.

The tow pin positioning mechanism is more clearly illustrated in FIGS. 4–7. A front bumper 37 and a rear bumper 38 are interconnected by a pair of longitudinally extending bars 39 and 40, rear crossmember 41 and bumper irons 42, with the bars 39 and 40 interconnected by a number of angle section crossmembers 43 to form a rigid bumper assembly. This bumper assembly is supported from the frame structure of the floor truck 10 by a forward pair of links 44 and a rearward pair of links 45 for movement between a forward lower position shown in FIGS. 4 and 5 and by the truck 16 of FIG. 3, and a rearward upper position illustrated by a truck 14 of FIG. 3 and indicated by the broken line showing the rear bumper 38 in FIG. 5. The swinging mounting of the bumper assembly on the links 44 and 45 provides a gravity-biased self-centering movement of the bumper assembly to the forward position thereof, the link pivots being vertically aligned in the forward position of the bumper assembly, and provides a change in elevation of the front and rear bumpers between the forward and rearward positions thereof. Swinging movement of the bumper assembly is confined to a longitudinal or fore and aft direction by a pair of forward guides 46 of channel section and pairs of rearward guides 48 of angle section, all guides being rigidly secured to the truck frame structure.

The retaining device 36 in the construction illustrated, consists of an auxiliary bumper mounted on a number of L-shaped arms 50 each pivotally supported in a bracket 52 on the truck structure as best shown in FIG. 4 so that the auxiliary bumper 36 is counterbalanced or normally urged to the operative position shown in FIG. 5. When the bumper assembly is moved to its rearward position however, the supporting arms 50 for the auxiliary bumper 36 are engaged by the upper surface of the rear bumper 38 so that when the bumper assembly reaches its rear position, the auxiliary bumper 36 is shifted to an inoperative position with relation to the tow pin positioning mechanism of a following truck.

Means are provided for moving the tow pin 18 to upper or nondriving position in response to movement of the bumper assembly to the rearward position thereof. The tow pin 18 is slidably mounted in an upper collar 54, suitably fixed on the front of the truck, and in a lower collar 55 carried by bracket structure 56 secured to the forward guides 46 through an intermediate resilient cushioning block 58. As shown in FIGS. 4 and 5, a pair of roller followers 60 are each rotatably mounted on an axle 61 carried by an interconnected bracket 62 and sleeve 63 mounted on the tow pin 18, the sleeve 63 extending through a double tapered bore 64 in the upper collar 54 and abutting a collar 66 on the tow pin. The rollers 60 engage portions 68 on the upper surfaces of the bumper assembly members 39 and 40 which portions 68 act as cams and include notches or recesses 70 in which the rollers 60 seat when the bumper assembly is in its full rear position; thereby providing overtravel of the pin 18 in the direction of movement to nondriving position. The cam portions 68 of the bumper assembly which produce the upward movement of the drive pin extend parallel to the path of pusher movement and hence offer no resistance to the shock absorbing movement of the pin in the collar 54 due to the cushion block 58.

Means are also provided for controlling the position of an antibackup device in response to movement of the bumper assembly between its forward and rearward positions. This antibackup device is best shown in FIGS. 4-6 and includes a pair of shoes 74, each engageable in a wedging manner with one of the pair of rear wheels 75 of the truck upon reverse rotation thereof, and each mounted on an arm 76 secured to a shaft 78 carried by a member 80 depending from the truck's frame structure. A crank 82 has one arm 83 secured to the shaft 78 and another arm 84 extending into underlying relation with one of the longitudinal members 39 or 40 of the bumper assembly. Each antibackup device is constructed so that the moment of the shoe 74 and supporting arm 76 overbalances the moment of the crank 82 and hence the shoe is normally urged into engagement with a wheel 75. When the bumper assembly is in the forward position, the crank arm 84 of each antibackup device is engaged by the bumper assembly to move the antibackup shoe 74 out of contact with the periphery of the associated wheel 75.

The bumper assembly is preferably provided at the forward end with a depending bumper plate 86 (FIG. 5) for engagement with some form of wayside stopping device 90 such as the plunger 91 which can be selectively positioned in or out of the path of travel of the bumper plate 86. A handle 92 on the tow pin collar 66 enables the pin to be manually moved between nondriving and riving positions.

The normal driving position of the tow pin and tow pin positioning mechanism is shown in FIG. 5, the movable forward bumper 37 projecting forwardly of the fixed pushing bumper 32. With the parts in this position, should a driven truck encounter an object in the path of travel other than a preceding truck, engagement will take place between the movable forward bumper 37 and the object, producing rearward movement of the bumper assembly with attendant movement of the tow pin 18 to nondriving position, movement of the antibackup device to wheel engaging position and movement of the auxiliary bumper 36 to inoperative position. The truck will stop and remain stopped until the object has been removed, thus providing a safety feature in normal operation. The same results will be obtained if a stop 91 is extended into the path of movement of front bumper plate 86.

Should a driven truck overtake and encounter a preceding stopped truck, the results will depend upon whether the tow pin positioning mechanism of the preceding truck is in the forward, normal driving position or in the rearward, nondriving position. If in the latter position, the movable front bumper 37 of the following truck will overlap and engage the movable rear bumper 38 of the stopped truck (as indicated at the left in FIG. 5) and the following truck will come to a halt through movement of its bumper assembly from the forward to the rearward position thereof and attendant movements of the tow pin, antibackup device and auxiliary bumper described above. The auxiliary bumper or retaining device 36 of the leading truck of a pair of trucks thus accumulated in a bank lies forwardly and above the movable front bumper 36 of the following truck of the pair; hence, if the bumper assembly of the forward truck is released for forward movement to the normal driving position thereof, the retainer 36 of forward truck will fall in ahead of the front bumper 37 of the following truck thus preventing forward movement of the bumper assembly of the following truck and attendant movement of the following truck's tow pin 18 to driving position until the tow pin of the leading truck, which moves to driving position by gravity upon forward movement of the associated bumper assembly, has been engaged by a pusher of the tow line and the leading truck moved on.

In the normal driving position of the tow pin positioning mechanism mentioned above the rear movable bumper 38 lies forwardly of the rear fixed pushing bumper 34, 35 an amount greater than the movable front bumper 37 extends forwardly of the forward fixed pushing bumper 32. Consequently if a driven floor truck with its parts in the normal driving position should overtake a preceding truck whose parts are also in a normal driving position, the fixed forward pushing bumper 32 of the following truck will contact the fixed rear pushing bumper 34, 35 of the leading truck as shown in FIG. 2.

The mounting of the movable bumper assembly of the forward and rear bumpers 37 and 38 for movement between a forward and a rearward position with a change in elevation therebetween, and specifically the swinging mounting of the bumper assembly in the embodiment disclosed, provides gravity-biased self-centering movement to a normal forward driving position; provides a vertical or upward component of motion for moving the tow pin, for moving the retainer or auxiliary bumper 36, and for moving the antibackup device; permits the use of a floating resilient mounting for the tow pin; provides overtravel of the tow pin to insure its full release or movement to nondriving position; and permits the retainer device 36 to operatively engage the tow pin positioning mechanism of a following truck in response to movement of the bumper assembly of the leading truck from the rearward to the forward position thereof, the retainer device 36 being inoperative with respect to the tow pin positioning mechanism of a following truck under all other conditions.

While preferred embodiments have been described above in detail, it will be understood that numerous modifications might be resorted to without departing from the scope of the invention as defined in the following claims.

I claim:

1. In a floor truck tow line having a plurality of floor trucks each equipped with a tow pin engageable in a driving position by a pusher of the tow line and with tow pin positioning mechanism of the type including a movable front bumper, a rear bumper and means operable in response to rearward movement of the front bumper for moving the tow pin to nondriving position and converting the rear bumper from a nonoperative to an operative condition with respect to engagement by the front bumper of an immediately following floor truck, whereby a series of floor trucks can be stopped and accumulated in a bank as each following floor truck overtakes the immediately preceding leading truck; the improvement comprising a retaining device mounted on at least one floor truck of each pair of adjacent leading and following floor trucks for holding the tow pin of the following truck in nondriving position until the tow pin of the leading truck has been engaged by a pusher of the tow line whereby floor trucks are released from a bank in the order of accumulation therein.

2. A floor truck tow line as claimed in claim 1 wherein the retaining device is mounted on the rear of a leading floor truck for engagement with the tow pin positioning mechanism of a following floor truck.

3. A floor truck tow line as claimed in claim 2 wherein the retaining device comprises an auxiliary bumper.

4. A floor truck tow line as claimed in claim 3 further including means mounting the auxiliary bumper for movement between an inoperative and an operative position with respect to the tow pin positioning mechanism of a following floor truck and means for moving the auxiliary bumper to the operative position thereof in response to movement of the tow pin of the leading floor truck to driving position.

5. A floor truck tow line as claimed in claim 1 further including means mounting the retaining device on the rear of a leading floor truck for movement between an inoperative and an operative position with respect to the tow pin positioning mechanism of a following floor truck and means for moving the retaining device to the operative position thereof in response to movement of the tow pin of the leading floor truck to driving position.

6. A floor truck tow line as claimed in claim 1 wherein the tow pin positioning mechanism includes a bumper assembly of interconnected front and rear bumpers, means mounting the bumper assembly on a floor truck for normally biased movement from a rearward position to a forward position, and means for moving the floor truck tow pin to nondriving position when the bumper assembly is moved to the rearward position; the forward bumper of a following truck being engageable with the rearward bumper of an immediately preceding leading truck in the rearward position thereof to produce rearward movement of the bumper assembly of the following truck and attendant movement of the tow pin associated therewith to nondriving position; the retaining device comprising a member mounted on the rear of each truck for holding the bumper assembly of a following truck in the rearward position thereof after the tow pin of the leading truck has been moved to driving position by forward movement of the bumper assembly of the leading truck.

7. A floor truck tow line as claimed in claim 6 wherein the bumper assembly mounting means includes means for producing a change in elevation of at least one of the front and rear bumpers between the rearward and forward positions of the bumper assembly.

8. A floor truck tow line as claimed in claim 1 wherein the tow pin positioning mechanism comprises a front bumper, a rear bumper and means interconnecting said front and rear bumper, link means mounting the front and rear bumpers on a floor truck for movement in unison between a forward lower position and a rearward higher position and for gravity-biased movement to said forward position, the rear bumper of a leading truck in the rearward higher position thereof being engageable by the front bumper of an immediately following truck in the forward lower position thereof, and means for moving the floor truck tow pin to nondriving position in response to movement of the bumpers from the forward to the rearward position thereof.

9. A floor truck tow line as claimed in claim 8 wherein the retainer device comprises an auxiliary bumper, means mounting the auxiliary bumper on the rear of each floor truck for engagement by the front bumper of a following floor truck in the rearward upper position thereof.

10. A floor truck tow line according to claim 9 wherein the auxiliary bumper is mounted for movement from an inoperative and an operative position with respect to engagement by the front bumper of an immediately following truck in response to movement of the tow pin of the leading truck to driving position.

11. A floor truck tow line according to claim 10 wherein the auxiliary bumper of a floor truck is moved to the inoperative position thereof by engagement with the floor truck rear bumper upon movement to the rearward higher position thereof.

12. Tow pin positioning mechanism for a floor truck having a tow pin movable between a driving position in which it is engageable by a pusher of a tow line and a nondriving position including a front bumper, a rear bumper and structure interconnecting said bumpers to form a bumper assembly; means mounting the bumper assembly on the floor truck for movement between a forward position and a rearward position with a change in elevation therebetween, means biasing the bumper assembly to the forward position thereof, means for moving the tow pin to nondriving position in response to movement of the bumper assembly to the rearward position, the rear bumper in the rearward position thereof being engageable by the front bumper of an immediately following truck in the forward position thereof.

13. Tow pin positioning mechanism as claimed in claim 12 further including retainer means on at least one of a pair of leading and immediately following floor trucks engageable with the pin positioning mechanism of the following truck in response to movement of the tow pin of the leading truck to driving position whereby the tow pin of the following truck is held in nondriving position until the tow pin of the leading truck has been engaged by a pusher of the tow line.

14. Tow pin positioning mechanism as claimed in claim 13 wherein the retainer means comprises a member mounted on the rear of a leading floor truck for engagement by the bumper assembly of an immediately following floor truck when in the rearward position thereof and in response to movement of the bumper assembly of the leading floor truck from the rearward to the forward position thereof.

15. Tow pin positioning mechanism as claimed in claim 12 wherein the means mounting the bumper assembly comprises link means suspending the bumper assembly from the floor truck for movement between a forward lower position and a rearward higher position and for gravity biased movement to said forward position.

16. Tow pin positioning mechanism as claimed in claim 15 further including follower means operatively associated with the floor truck tow pin for moving the tow pin to nondriving position in response to movement of the bumper assembly between the lower and upper positions thereof.

17. Tow pin positioning mechanism as claimed in claim 15 further including an antibackup device mounted on the floor truck for normally biased movement to an operative position, and means operated by the bumper assembly for moving the antibackup device to an inoperative position in response to movement of the bumper assembly to the forward lower position thereof.

18. Tow pin positioning mechanism as claimed in claim 12 wherein the bumper assembly structure interconnecting the front and rear bumpers includes a pair of parallel members extending longitudinally of the floor truck on either side of the longitudinal center line thereof, link means suspending said parallel members from the floor truck for gravity-biased movement of the bumper assembly from a rearward upward position to a forward lower position, and a cam portion on at least one of said members coacting with follower means operatively associated with the tow pin for moving the tow pin between driving and nondriving positions.

19. Tow pin positioning mechanism as claimed in claim 18 further including means resiliently mounting the tow pin on the longitudinal center line of the truck intermediate said parallel members of the bumper assembly.

20. Tow pin positioning mechanism as claimed in claim 19 further including an auxiliary bumper, means mounting the auxiliary bumper on the rear of a floor truck for movement between an operative and an inoperative position relative to the front bumper of the bumper assembly of an immediately following floor truck, means normally biasing the auxiliary bumper to the operative position thereof, and means for moving the auxiliary bumper to the inoperative position thereof in response to rearward movement of the bumper assembly of the truck on which the auxiliary bumper is mounted.

* * * * *